(12) United States Patent
Helle et al.

(10) Patent No.: US 8,454,893 B2
(45) Date of Patent: Jun. 4, 2013

(54) FLUID SAMPLING SYSTEM WITH AN IN-LINE PROBE

(75) Inventors: Kevin Helle, Bartlett, IL (US); Jay Reed, Elk Grove Village, IL (US); Michael T. Schneider, Crystal Lake, IL (US)

(73) Assignee: Medi-Physics, Inc., Princeton, NJ (US)

( * ) Notice: Subject to any disclaimer, the term of this patent is extended or adjusted under 35 U.S.C. 154(b) by 642 days.

(21) Appl. No.: 12/529,354

(22) PCT Filed: Mar. 14, 2008

(86) PCT No.: PCT/US2008/056926
§ 371 (c)(1),
(2), (4) Date: Sep. 1, 2009

(87) PCT Pub. No.: WO2008/112945
PCT Pub. Date: Sep. 18, 2008

(65) Prior Publication Data
US 2010/0089184 A1    Apr. 15, 2010

Related U.S. Application Data

(60) Provisional application No. 60/894,943, filed on Mar. 15, 2007.

(51) Int. Cl.
| | |
|---|---|
| *G01N 21/00* | (2006.01) |
| *G01N 1/14* | (2006.01) |
| *G01N 30/00* | (2006.01) |
| *G01N 1/00* | (2006.01) |
| *G01N 33/00* | (2006.01) |
| *G01N 33/48* | (2006.01) |
| *B01L 3/00* | (2006.01) |
| *G01F 25/00* | (2006.01) |

(52) U.S. Cl.
USPC ........ 422/81; 73/863.83; 73/863.81; 73/1.73; 73/61.55; 73/61.56; 436/174; 436/63; 436/177; 422/68.1; 422/500

(58) Field of Classification Search
None
See application file for complete search history.

(56) References Cited

U.S. PATENT DOCUMENTS
| | | |
|---|---|---|
| 4,198,862 A | 4/1980 | Rubin |
| 4,465,593 A | 8/1984 | Wemhoff |

(Continued)

FOREIGN PATENT DOCUMENTS
| | | |
|---|---|---|
| DE | 19758356 | 7/1999 |
| EP | 0716879 | 6/1996 |

(Continued)

OTHER PUBLICATIONS

PCT/US2008/056926 Int'l Search Report/Written Opinion Dated Jul. 3, 2008.

*Primary Examiner* — Bobby Ramdhanie
*Assistant Examiner* — Jennifer Wecker
(74) *Attorney, Agent, or Firm* — Robert F. Chisholm (57) ABSTRACT

A fluid sampling system for sampling the contents of a container of fluid includes an elongate hollow sampling conduit extending between a first end for withdrawing the fluid from the container and a second end for returning the fluid to the container, pump means for circulating the fluid between the container and the sampling conduit, a sample probe having a tip extending into the sampling conduit so as to contact the fluid within the sampling conduit, and a controller unit for controlling flow of the fluid within the sampling conduit and monitoring the properties of interest of the fluid within the sampling conduit via signals received from the sample probe. The present invention also provides an in-line pH probe.

44 Claims, 3 Drawing Sheets

U.S. PATENT DOCUMENTS

| | | |
|---|---|---|
| 5,422,014 A | 6/1995 | Allen et al. |
| 6,123,904 A * | 9/2000 | Wright et al. .................. 422/80 |
| 2004/0076546 A1* | 4/2004 | Bissett ........................ 422/68.1 |
| 2004/0087031 A1* | 5/2004 | Simon, Jr. ..................... 436/100 |
| 2005/0074363 A1* | 4/2005 | Dunfee ........................... 422/81 |
| 2005/0273203 A1 | 12/2005 | Belafiore et al. |
| 2006/0057554 A1* | 3/2006 | Watling et al. ..................... 435/4 |
| 2007/0104616 A1* | 5/2007 | Keenan et al. ................ 422/100 |
| 2008/0098828 A1* | 5/2008 | Li et al. ...................... 73/863.73 |
| 2010/0273273 A1* | 10/2010 | Cross et al. ................... 436/174 |

FOREIGN PATENT DOCUMENTS

| | | |
|---|---|---|
| EP | 716879 A2 * | 6/1996 |
| EP | 1790981 | 5/2007 |
| GB | 1463488 | 2/1977 |
| GB | 2119522 | 11/1983 |

\* cited by examiner

FLUID SAMPLING SYSTEM WITH AN IN-LINE PROBE

This application is a filing under 35 U.S.C. 371 of international application number PCT/US2008/056926, filed Mar. 14, 2008, which claims priority to U.S. application No. 60/894,943 filed Mar. 15, 2007, the entire disclosure of which is hereby incorporated by reference.

FIELD OF THE INVENTION

The present invention relates to fluid sampling systems. More specifically, the present invention relates to a closed-loop fluid sampling systems having an in-line probe.

BACKGROUND OF THE INVENTION

Producing radioactive Thallium products for pharmaceutical use, like other hazardous or valuable materials, is a fairly complex process with many steps and requirements. One requirement during production is that pH samples of the product have to be tested very often. A typical day may require four to ten pH tests. Each test requires a two-point calibration of the probe, along with a wash and dry of the probe before and between taking these calibration measurements. A two-point calibration requires that the pH probe be cleaned and dried, followed by a dip in a first buffer fluid, setting the probe electronics to the pH level of the first buffer; a second cleaning and drying, followed by a dip in a second buffer, and setting the probe electronics to reflect the second buffer level. As a result, a typical day of thallium production may require many buffer dips, cleans, and dries per day. Furthermore, performing these tests manually, with paper testing, dipping of the probe into fluids such as buffer 4, buffer 7, and water for injection, and subsequent towel drying the of the probe is very manually intensive work, time consuming, and also results in shutting down the process as well as risking contamination or exposure to the human operator.

Additionally, testing the pH is a destructive test and waste of the sampled fluid because it requires fluid to be removed from the fluid container and tested for its pH level. Should the pH level be too high or too low, a pH additive is added to the sample. Testing is repeated until the sample fluid reads as being at the desired pH level. All of the fluid tested is lost or wasted since it will not be added back into original sample container but disposed of as waste during the subsequent cleaning of the probe. Even though the amounts of fluid may seem to be small, for particularly hazardous or valuable fluids, such losses can be quite costly due to the loss of product or even just the cost of handing and disposing of a radioactive or biologically sensitive material.

In order to eliminate the loss or exposure of the hazardous fluid, there is a need a for a closed-loop conduit system incorporating an in-line probe. While probes for manually dipping into a sample well are available, no probes are provided in an assembly for use in a closed-loop system. In order to calibrate or clean the probe, the probe must be manually transferred from the sample well to a cleaning or calibration station. Valuable or hazardous product on the probe may be lost or exposed to the atmosphere, endangering the surrounding environment, the handler, or the product itself.

There is therefore a need for a probe which may be provided integrally to a fluid handling or dispense system. There is also a need for a fluid sampling system with an in-line probe. The in-line probe should be able to be calibrated and cleaned without requiring disassembly of the probe from the system. Additionally, there is a need for a fluid sampling system which allows the monitoring and adjustment of the pH level of the fluid conducted within.

SUMMARY OF THE INVENTION

In view of the needs of the prior art, the present invention provides a fluid sampling probe for use in a fluid handling system. The probe include an elongate conduit segment having a conduit body defining first and second opposed open ends and an elongate fluid passageway extending in fluid communication therebetween. The conduit body further includes a probe aperture in fluid communication with the fluid passageway. A fluid sampling probe having an elongate probe body is supported in the probe aperture so that a first end of the probe extends into the fluid passageway.

The present invention also provides a fluid sampling system for sampling the contents of a source of fluid having an elongate hollow sampling conduit extending between a first end for withdrawing the fluid from the container and a second end for returning the fluid to the container. The sampling system also includes pump means for circulating the fluid between the container and the sampling conduit and a sample probe having a tip extending into the sampling conduit so as to contact the fluid within the sampling conduit. The sampling system further includes at least one of a calibration fluid source, a wash fluid source, and an additive source. A controller unit controls flow of the fluid to and from the container as well as flow from any calibration fluid source, wash fluid source or additive source so included in the sampling system while also being able to monitor the properties of interest of the fluid within the sampling conduit via signals received from said sample probe.

DETAILED DESCRIPTION OF THE PREFERRED EMBODIMENT

Figure 1:
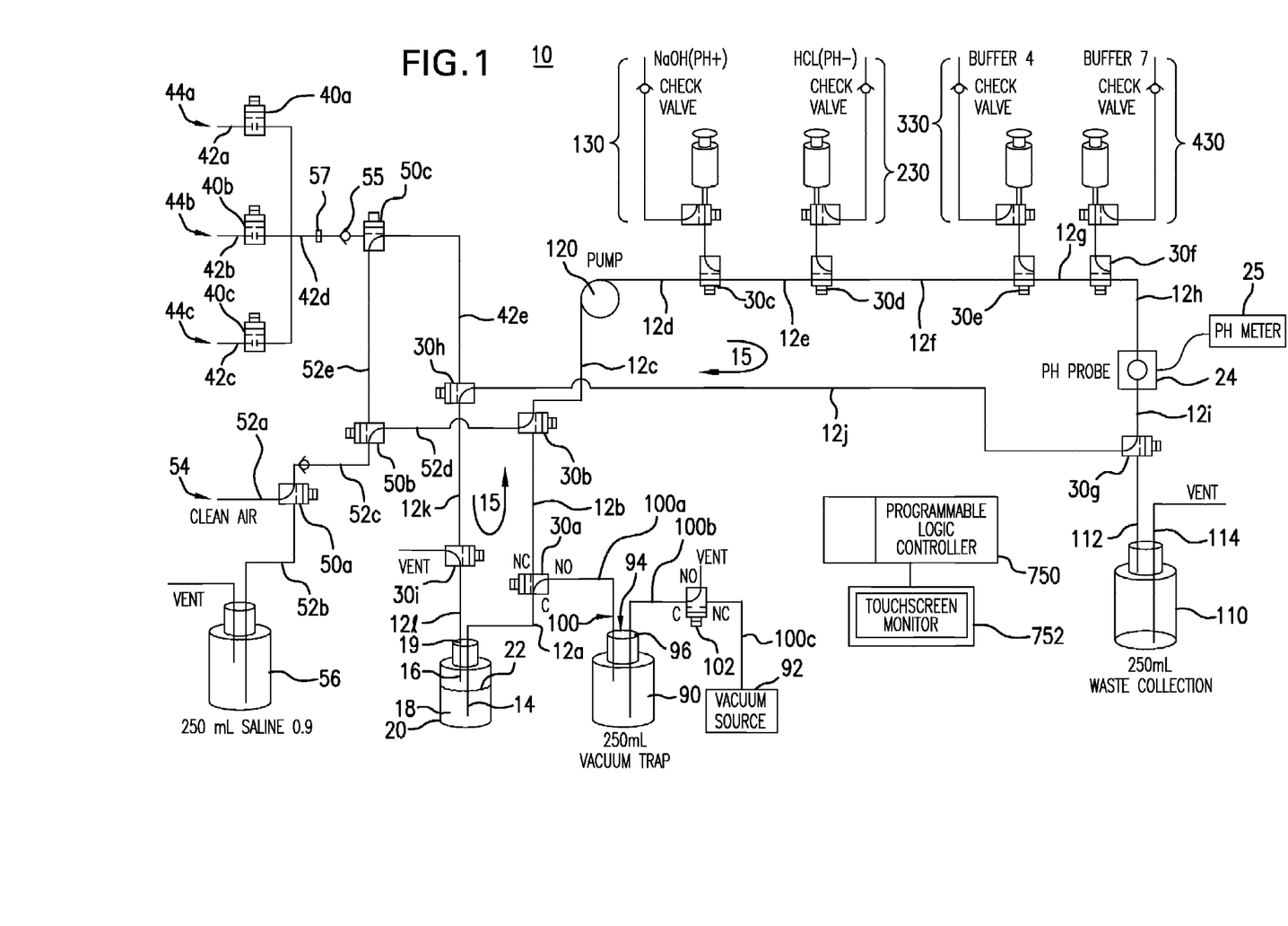
FIG. 1 depicts a schematic of the fluid handling system of the present invention.

With reference to FIG. 1, the present invention provides a fluid sampling system 10 which is able to continuously monitor and adjust a fluid's characteristics without the need for manual exposure or intervention. The present invention is able to introduce a hazardous material into a closed loop system and containing the waste, maintaining separation of hazardous material from the environment, protecting the environment and the material from each other. There is no need to break down system 10 for maintenance, as it is self-contained to clean itself between uses. Additionally, the present invention allows for non-destructive testing of the fluid product. Some fluids, such as radioactive thallium, are very expensive to manufacture, the present invention saves fluid and thus reduces costs of lost product. Furthermore, while the current sampling process for a radioactive product takes over one hour to complete, the present invention is able complete all steps within about 5 minutes. Fluid sampling system 10 includes a touch-screen monitor 752 for interfacing between an operator and a programmable logic controller 750. Controller 750 controls each of the mechanical and electro-mechanical components of the present invention.

Fluid sampling system 10 includes a hollow conduit 12 comprised of various conduit segments 12*a-l* extending between a first open free end 14 and a second open free end 16 within the cavity 18 of a product collection bottle 20. Conduit 12 provides an interruptable circular flow path 15 beginning and ending at cavity 18 of product collection container 20. Container 20 is typically a 100 mL product collection bottle which holds a fluid of interest 22 within its cavity 18. By way of illustration and not of limitation, fluid 22 may be radioactive thallium, but it is further contemplated that system 10 may be used for handling a wide variety of hazardous materials or for materials which should be protected from the environment. Free ends 14 and 16 of conduit 12 desirably extend into cavity 18 so as to be in sealed fluid communication therewith, such that fluid 22 is isolated from the outside environment. Typically container 20 includes a cap or stopper 19 which permits ends 14 and 16 of conduit 12 to extend therethrough so as to place cavity 18 in isolated fluid communication with flow path 15.

Conduit 12 thus provides a closed circuit loop for the flow of fluid 22 into first end 14 of conduit segment 12*a*, through flow path 15, and out second end 16 back into cavity 18. While flow path 15 is defined by the various conduit segments, and extends through the provided valves and probe housing, its typical flow direction is depicted by arrows 15 in FIG. 1. A pH probe 24 is extends into passageway 15 so as to provide an in-line probe for determining the pH level of the fluid flowing therepast. Conduit segments 12*a-k* extend in sealed fluid communication between a series of valves 30*a-i*, described further hereinbelow, provided along flow path 15.

Additional valves 40*a-c* regulate the provision of product fluids from supply ports 44*a-c*, respectively, to be introduced into container 20 through a conduit 42 including conduit segments 42*a-e*. Conduit supply ports 44*a-c* are provided in fluid communication with three distinct sources of product fluid, not shown. While shown in FIG. 1, valves 40*a-c* and conduit segments 42*a-d* are not central to the present invention. Any system for supplying a fluid of interest to valve 50*c* may be incorporated into the system of the present invention. Valves 50*a-b* regulate the provision of clean air and saline through conduits 12 and conduit segments 42*e* and 52*a-e* for the purpose of cleaning and drying flowpath 15 and conduit segment 42*e* between runs of filling successive containers 20 with a product fluid. Clean air, or any other suitable drying agent, is provided to valve 50*a* through a clean air port 54 which is in fluid communication with a source of clean air, not shown. Saline, or any other suitable washing fluid, is provided from a saline container 56 to valve 50*a* through conduit 52*b*.

Conduit 12 desirably incorporates a total length of approximately 2 feet of 1/16" to 1/8" inner diameter of tubing such that the total volume of flow path 15 is less than about 3 ml. It is further contemplated that conduit 12 may be made from polypropylene, tygon or any other suitable material for pharmaceutical preparation.

Figure 2:
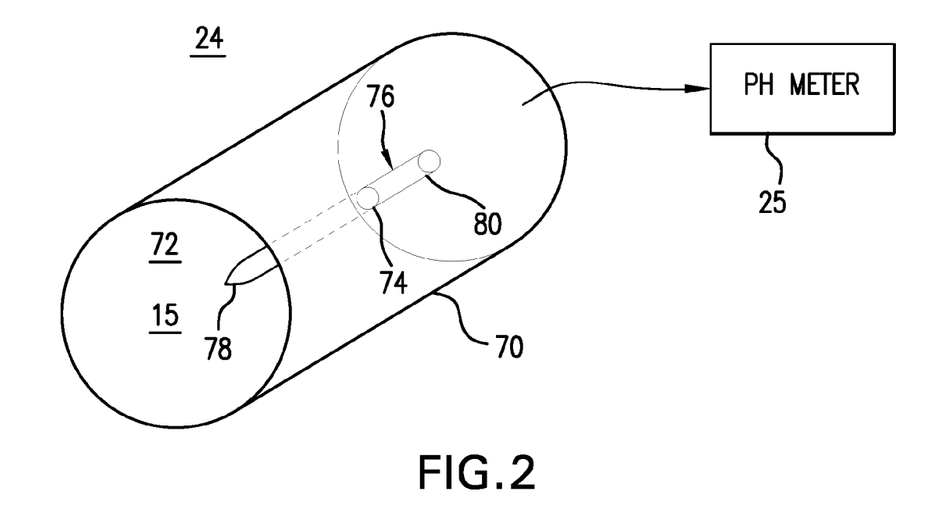
FIG. 2 depicts an in-line sampling probe of the present invention.

In-line probe 24 is desirably provided extending though a segment of stainless steel tubing which has been incorporated into the fluid circuit. In-line probe 24 is provided to detect the pH level of fluid 22 as it flows through conduit 12. As shown in FIG. 2, in-line probe 24 includes a housing 70 defining a passageway 72 therethrough for receiving free ends of conduit segments 12*h* and 12*i* therein so as to be placed in fluid communication with, and thus form part of, flow path 15. Housing 70 is desirably a segment of stainless steel conduit. Housing 70 also defines a probe aperture 74 extending in fluid communication between passageway 72 and the exterior of housing 12. An elongate probe body 76 extends through aperture 74 so that its sampling tip 78 desirably extends into about the center of passageway 72. The opposing end 80 of probe body 76 is positioned in electronic communication with a pH meter 25 which determines the pH level of fluid 22 as it flows therepast. In-line probe 24 has been constructed using a probe body provided by Fisher Scientific. In the past, such probe bodies were used for manually dipping into a sample container having a sample of a product fluid therein. The present invention incorporates the probe body into a fluid sampling and dispense system as described herein. While in-line probe 24 is shown and described for measuring pH of a fluid of interest, one of skill in the art will recognize that other probe bodies may be incorporated into a sampling system of the present invention for detecting, by way of illustration and not of limitation, purity, concentration, color, or turbidity.

Probe 24 provides a signal indicative of the measured pH level of the fluid 22 flowing therepast. While the present invention is shown and described as providing a system for measuring and adjusting the pH-level of the fluid, other fluid characteristics are also contemplated as being measured by probe 24.

Referring again to FIG. 1, fluid sampling system 10 desirably provides a vacuum trap 90 provided in isolatable fluid communication between valve 30*a* and a vacuum source 92. Vacuum trap 90 is typically a bottle having a stopper 94 in its mouth 96. A vacuum conduit 100 having vacuum conduit segments 100*a-c* extending between valve 30*a* and vacuum source 92. Stopper 94 accommodates segment 100*a* and 100*b* therethrough. Valve 102 isolates vacuum source 92 from vacuum trap 90. Providing vacuum trap 90 ensures that any radioactive or other environmentally-sensitive fluid drawn to product collection bottle 20 is contained prior to reaching vacuum source 92.

Valve 30*g* is connected to a waste collection container 110 via a waste conduit 112. A waste vent conduit 114 extends from waste collection container 110. Waste collection container 110 is provided to collect and vent the saline and clean air, respectively, after each has been sufficiently circulated through conduits 12, 42*e*, and 52*d-e* between dispensings to a respective product collection bottle 20. Waste vent conduit 114 is desirably placed in fluid communication with a means for withdrawing waste fluid from container 110. The withdrawing means may include, for purposes of illustration and not of limitation, a peristaltic pump, a syringe pump, a vacuum source, or even a gravity siphon.

Fluid sampling system 10 also includes a fluid pump 120 placed in fluid communication with flow path 15 between conduit segments 12*c* and 12*d*. Pump 120 is desirably a peristaltic pump. Between pump 120 and in-line probe 24, fluid sampling system 10 provides for four separate fluid inputs at valves 30*c-f*. Valve 30*c* provides for the input into flow path 15 of a high pH fluid, such as NaOH. Valve 30*d* provides for the input into flow path 15 of a low pH fluid, such as HCl. Valves 30*c* and 30*d* thus provide for the adjustment of the pH level of fluid 22 in response to the reading provided by in-line probe 24. Valve 30*e* provides for the input into fluid flow path 15 of a solution of buffer 4, i.e. a solution having a known low pH level. Valve 30*f*, conversely, provides for the input into fluid flow path 15 of a solution of buffer 7, a solution having a known high pH level. Valves 30*e* and 30*f* provide for the calibration of in-line probe 24 prior to drawing fluid 22 into container 20. Saline solution and clean air will desirably circulate through flow path 15 between the calibration runs and the pH sampling runs for fluid 22.

Figure 3:
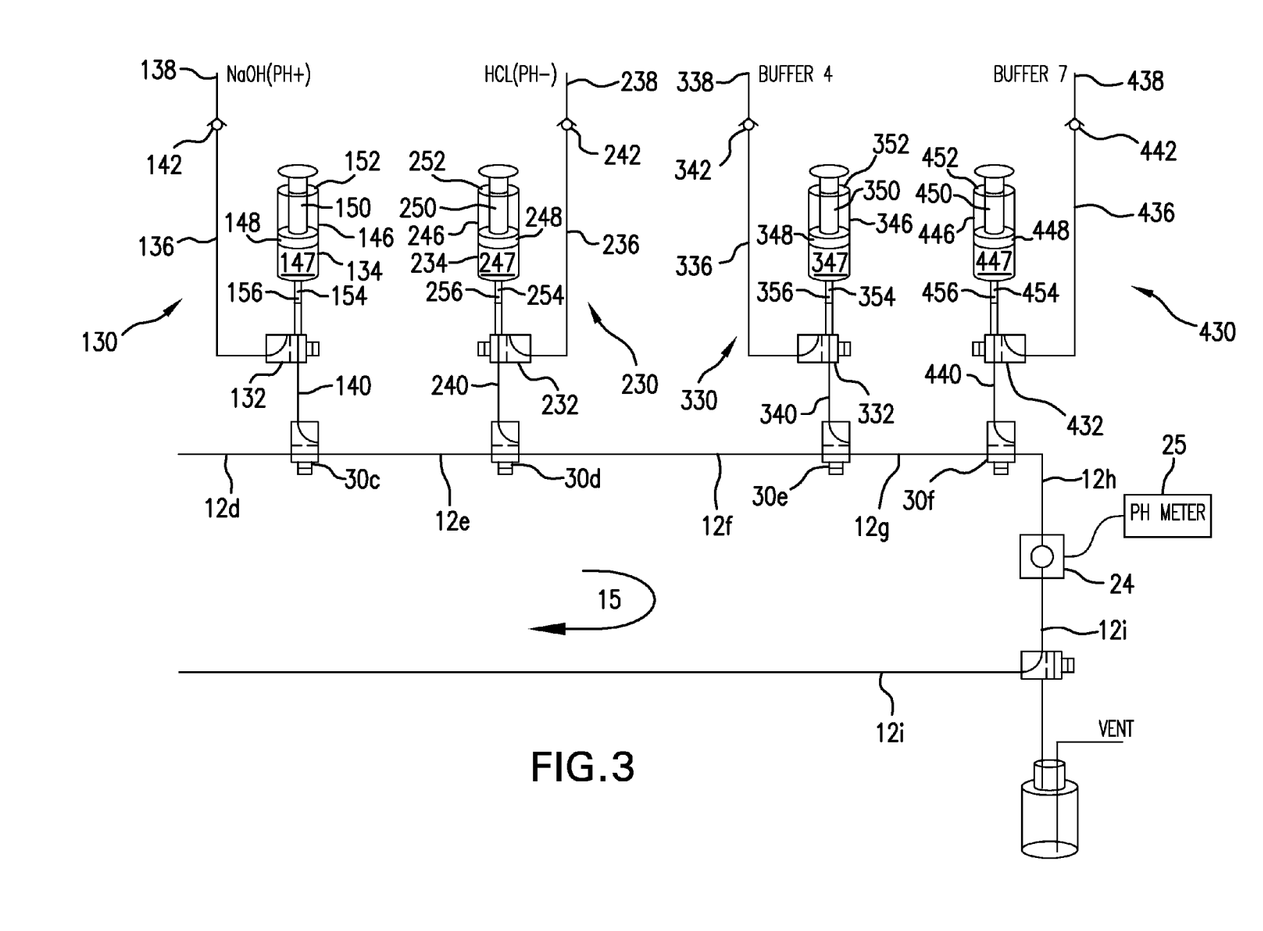
FIG. 3 depicts the pH-adjusting sub-systems and the calibration sub-systems of the fluid handling system of the present invention.
Figure 4:
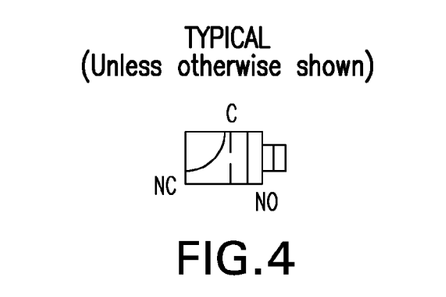
FIG. 4 depicts a valve used in the fluid handling system of the present invention.

With additional reference to FIG. 3, valve 30*c* selectably connects conduit segment 12*e* with a high-pH additive system 130. System 130 desirably provides an additive such as NaOH into fluidpath 15 so as to raise the pH level of the fluid being analyzed. High-pH additive system 130 includes a flow control valve 132, a syringe pump 134, a first conduit 136 extending between valve 132 and an input port 138, and a second conduit 140 extending between valves 132 and 30c. Input port 138 is desirably placed in fluid communication with a bulk source of high-pH additive (not shown). A check valve 142 is provided along conduit 136 to prevent flow from traveling from valve 132 towards input port 138. Syringe pump 134 is an electronically-controlled syringe device having an elongate barrel 146 defining a barrel cavity 147 and supporting a movable piston 148 therein. An elongate piston rod 150 extends between piston 148 and a free end 152 which is engaged for urging piston 148 in an extended or retracted direction through barrel cavity 147. Presently, a 50 cc syringe manufactured by Becton-Dickinson is employed for syringe pump 134. Barrel 146 also includes a luer-lock tip 154 defining a flow port 156 in fluid communication between barrel cavity 147 and flow control valve 132. Suitable connection between tip 154 and valve 132 may be provided to extend the separation between the two while maintaining fluid integrity therebetween. Flow control valve 132 provides for selectable fluid flow from a high pH bulk source to barrel cavity 147, and from barrel cavity 147 to valve 30c. As piston 148 is drawn in a retracted direction, flow control valve 132 is set to allow the high pH fluid to be drawn through input port 138 into barrel cavity 147. When piston 148 is extended towards flow port 156, valves 132 and 30c will be set to allow the high pH fluid to be injected into flow path 15.

Valve 30d selectably connects conduit segment 12f with a low-pH additive system 230. System 430 desirably provides an additive such as HCl so as to lower the pH level of the fluid in fluidpath 15. Low-pH additive system 230 includes a flow control valve 232, a syringe pump 234, a first conduit 236 extending between valve 232 and an input port 238, and a second conduit 240 extending between valve 232 and 30d. Input port 238 is desirably placed in fluid communication with a bulk source of low-pH additive (not shown). A check valve 242 is provided along conduit 236 to prevent flow from traveling from valve 232 towards input port 238. Syringe pump 234 is an electronically-controlled syringe device having an elongate barrel 246 defining a barrel cavity 247 and supporting a movable piston 248 therein. An elongate piston rod 250 extends between piston 248 and a free end 252 which is engaged for urging piston 248 in an extended or refracted direction through barrel cavity 247. Presently, a 50 cc syringe manufactured by Becton-Dickinson is employed for syringe pump 234. Barrel 246 also includes a luer-lock tip 254 defining a flow port 256 in fluid communication between barrel cavity 247 and flow control valve 232. Suitable connection between tip 254 and valve 232 may be provided to extend the separation between the two while maintaining fluid integrity therebetween. Flow control valve 232 provides for selectable fluid flow from a low pH bulk source to barrel cavity 247, and from barrel cavity 247 to valve 30d. As piston 248 is drawn in a refracted direction, flow control valve 232 is set to allow the low pH fluid to be drawn through input port 238 into barrel cavity 247. When piston 248 is extended towards flow port 256, valves 232 and 30d will be set to allow the low pH fluid to be injected into flow path 15.

Still referring to FIG. 3, valve 30e selectably connects conduit segment 12g with a low-buffer additive system 330. The low-buffer additive has a known, relatively low, pH level and may be run through fluidpath 15 in order to calibrate probe 24. Low-buffer additive system 330 includes a flow control valve 332, a syringe pump 334, a first conduit 336 extending between valve 332 and an input port 338, and a second conduit 340 extending between valve 332 and 30e. Input port 338 is desirably placed in fluid communication with a bulk source of Low-buffer additive (not shown). A check valve 342 is provided along conduit 336 to prevent flow from traveling from valve 332 towards input port 338. Syringe pump 334 is an electronically-controlled syringe device having an elongate barrel 346 defining a barrel cavity 347 and supporting a movable piston 348 therein. An elongate piston rod 350 extends between piston 348 and a free end 352 which is engaged for urging piston 348 in an extended or retracted direction through barrel cavity 347. Presently, a 50 cc syringe manufactured by Becton-Dickinson is employed for syringe pump 334. Barrel 346 also includes a luer-lock tip 354 defining a flow port 356 in fluid communication between barrel cavity 347 and flow control valve 332. Suitable connection between tip 354 and valve 332 may be provided to extend the separation between the two while maintaining fluid integrity therebetween. Flow control valve 332 provides for selectable fluid flow from a low-buffer bulk source to barrel cavity 347, and from barrel cavity 347 to valve 30e. As piston 348 is drawn in a retracted direction, flow control valve 332 is set to allow the low-buffer fluid to be drawn through input port 338 into barrel cavity 347. When piston 348 is extended towards flow port 356, valves 332 and 30e will be set to allow the low-buffer fluid to be injected into flow path 15.

Valve 30f selectably connects conduit segment 12h with a high-buffer additive system 430. The high-buffer additive has a known, relatively high, pH level and may be run through fluidpath 15 in order to calibrate probe 24. High-buffer additive system 430 includes a flow control valve 432, a syringe pump 434, a first conduit 436 extending between valve 432 and an input port 438, and a second conduit 440 extending between valve 432 and 30f. Input port 438 is desirably placed in fluid communication with a bulk source of high-buffer additive (not shown). A check valve 442 is provided along conduit 436 to prevent flow from traveling from valve 432 towards input port 438. Syringe pump 434 is an electronically-controlled syringe device having an elongate barrel 446 defining a barrel cavity 447 and supporting a movable piston 448 therein. An elongate piston rod 450 extends between piston 448 and a free end 452 which is engaged for urging piston 448 in an extended or retracted direction through barrel cavity 447. Presently, a 50 cc syringe manufactured by Becton-Dickinson is employed for syringe pump 434. Barrel 446 also includes a luer-lock tip 454 defining a flow port 456 in fluid communication between barrel cavity 447 and flow control valve 432. Suitable connection between tip 454 and valve 432 may be provided to extend the separation between the two while maintaining fluid integrity therebetween. Flow control valve 432 provides for selectable fluid flow from a high-buffer bulk source to barrel cavity 447, and from barrel cavity 447 to valve 30f. As piston 448 is drawn in a retracted direction, flow control valve 432 is set to allow the high-buffer fluid to be drawn through input port 438 into barrel cavity 447. When piston 448 is extended towards flow port 456, valves 432 and 30f will be set to allow the high-buffer fluid to be injected into flow path 15.

Each of the valves and pumps of the present invention are controlled through a programmable logic controller 750 which is itself desirably receives operator inputs through a touchscreen monitor 752. A Controllogix processor having 3.5 Megabytes of nonvolatile memory sold by Allen-Bradley Co. was used in constructing the present invention. Monitor 752 was a an Allen-Bradley Co. Panelview Plus 1500 304× 228 mm, 1024×768 18-Bit color graphics, batter backed clock timestamps, with extended 128 MB/128 MB Ethernet.

Controller 750 desirably provides command and control of each valve and pump through a standard RS-232 interface, although any manner of control, such as either wireless or hard-wired, of each of the valves and pumps is further contemplated. The pH meter 25 incorporated was manufactured by Cole-Parmer as the Orion Perphect Model 370, 110 VAX, including electrode part #58820-59, and AC adaptor, PS232 output. Additionally, pH meter 25 may provide for wireless or hard-wired interface to monitor 752 or simply provide its own display of the measured pH of a fluid in fluidpath 15 in an operator-convenient location. It is further contemplated that data from meter 25 may be printed out or sent straight to an electronic record system which records and stores the data.

Additionally, while pumps 134, 234, 334, and 434 are described as being syringe pumps, the present invention contemplates that any pump which provides for high precision microdispense (with minimum dispenses of about 0.05 ml) may be employed. Each such pump typically has its own controller which interfaces with controller 750 (typically a standard interface such as an RS232 connection) and is a solid state remotely programmable pump. These pumps are desirably either peristaltic or syringe pumps.

The valves are generally incorporated to provide another fluid or receptacle in selectable fluid communication with passageway 15. "Selectable fluid communication" describes the valves ability to place one of two selectable input lines into fluid communication with a third fluid line.

Each valve is desirably a biochem valve with either a Teflon or stainless steel flow path. The valves are desirably operable by a controllable solenoid although it is further contemplated that each valve may be operated manually. The 3-way valves used to construct system 10 were manufactured by ASCO and include Teflon wetted parts, ¼-28 ports, 0.062 orifice, max pressure of 30 psi, 24 volt DC, 5.3 watts.

System 10 provides thus provides a closed loop system for measuring the pH of a fluid of interest. System 10 is able to wash and dry its fluid-handling conduit between successive runs. Additionally, system 10 provides a closed loop system for calibrating probe 24.

First Calibration

Starting with conduit segments 12h-i in a clean and dry condition, system 10 closes the appropriate valves to isolate these segments so as to allow high-buffer fluid to be dispensed directly from pump 434, through in-line probe 24 and directly into waste container 110. Controller 110, knowing the pH level of the high-buffer fluid can correct or interpret the signal from probe 24 so as to read the correct pH level of the high-buffer fluid. Valve 30f will isolate conduit 440 from fluidpath 15. Valves 50a, 50b and 30b-g will then cooperate to serially provide first saline solution and then clean air to and through conduit segments 52c, 52d, and 12c-i so as to clean and dry conduit segments 12h and 12i.

Second Calibration

Then, with conduit segments 12g-i in a clean and dry condition, system 10 closes the appropriate valves to isolate these segments so as to allow low-buffer fluid to be dispensed directly from pump 334, through in-line probe 24 and directly into waste container 110. Controller 110, knowing the pH level of the low-buffer fluid can correct or interpret the signal from probe 24 so as to read the correct pH level of the low-buffer fluid. Valve 30e will then isolate conduit 340 from fluidpath 15. Valves 50a, 50b and 30b-g will then cooperate to serially provide first saline solution and then clean air to and through conduit segments 52c, 52d, and 12c-i so as to clean and dry conduit segments 12g-i.

With system 10 thus calibrated to read the correct pH of the fluid flowing through in-line probe 24, system 10 is ready to read and adjust the pH level of the fluid.

Introduction of Fluid

Fluid 22 is introduced into system 10 through valve 50c. A check valve 55 is provided to ensure one-way flow of fluid. Additionally, a 0.22 micron filter 57 is provided to capture particulate prior to entering system 10. The actual plumbing between source ports 44a-c and valve 50c is not considered salient to the instant invention. The present invention contemplates that each of valves 40a-c may be provided in selectable fluid communication with a wash and dry fluid source when in the closed position so as to wash and clean the fluid line 42d between the respective valve 40a-c and valve 50c. Controller 750 operates the appropriate valve 40a-c and valves 50c, 30h, 30i, 30a, and 103 with vacuum source 92 so as to draw fluid from the appropriate source into cavity 18 of container 20. It is contemplated that for this filling process, free end 14 of conduit segment 12a may be retracted away from the bottom of container cavity 18 so as not to draw fluid 22 towards vacuum trap 90 before the requisite amount of fluid reaches container 20.

Adjusting pH of Sample Fluid

Once container 20 is filled with the appropriate fluid 22 of interest, system 10 is then able to perform a closed loop analysis and adjustment of the fluid's pH level. System 10 closes the appropriate valves to place cavity 18 in isolated fluid communication with fluidpath 15. Pump 120 then circulates fluid 22 through fluidpath 15 so as to pass through in-line probe 24 where its pH is measured. The fluid is thus measured dynamically as the fluid circulates. If the measured pH level falls outside the prescribed level or range for fluid 22, pump 120 will pause fluid flow. Then the appropriate valve 30c or 30d will close so as allow the appropriate pH additive system 130 or 230 to dispense a metered amount of the respective additive fluid. Should fluid 22 need a higher pH level, additive system 130 will dispense into conduit segment 12e. Should fluid 22 need a lower pH level, additive system 230 will dispense into conduit segment 12f. After the appropriate additive system has provided an adjusting aliquot into fluidpath 15, its valve 30c or 30d will then re-open so as to re-establish fluid flowpath 15 in fluid communication with cavity 18 of container 20. Pump 120 will then circulate fluid 22 through fluidpath 15 multiple times so as to ensure mixing of the additive and fluid 22 into a homogenous mixture. After a predetermined time of circulating, system 10 will again read the pH level at probe 24. System 10 will again take corrective action, if necessary. Once system 10 reads an acceptable pH level for fluid 22, container 20 may be removed from system 10.

Post-Measurement Washing

A second container 20 may then be placed in fluid communication with fluidpath 15. Any of the original fluid 22 still retained in fluidpath 15 will first need to be removed. System 10 cleans conduit segments 12l and 12a by closing valves 30i, 30a and 102 to draw the fluid entrained within segments 12l and 12a into container 90. Then, vacuum source 92 operates to draw saline fluid from container 56 through segments 52b, 52c, 52e, 42c, 12k, and 12l into cavity 18 of new container 20 and out through segments 12a and 100a into container 90. As the volumes of the containers are much higher than the total volume of all the conduits, system 10 can ensure that the entrapped fluid 22 will not be drawn out line 100c to vacuum source 92. Clean air will then be provided through conduit 52a, 52c, 52e, 42c, 12k, and 12l into cavity 18 of new container 20 and out through segments 12a and 100a into container 90. The clean air may be drawn towards vacuum source 92.

System 10 then instructs vacuum source 92 to draw a sufficient volume of saline fluid from container 56 through segments 52b, 52c, 52e, 42c, 12k, and 12l into cavity 18 of new container 20 so as to clean fluidpath 15. Clean air is then similarly drawn through conduit 52a, 52c, 52e, 42c, 12k, and 12l into cavity 18 of new container 20. System 10 then opens each of valves 30a-i to place cavity 18 with the wash solution in container 20 in fluid communication with fluidpath 15. Pump 120 then initiates a single circulation the wash fluid through fluidpath 15 so that the entrapped fluid 22 in fluidpath 15 is displaced into new container 20 without beginning back into conduit segment 12a. System 10 then closes valves 30i, 30a and 102 and operates vacuum source 92 to draw the fluid entrained within segments 12l and 12a and new container 20 into container 90.

At this point, segments 12b-k contain saline solution. First pump 120 draws clean air from source 54 through segments 52a, 52c, 52d, 12c-i, and 112 and out vent 114 until the previously wet segments are dry. Then, valve 30g is closed and pump 120 and vacuum source 92 cooperate to draw clean air from source 54 through segments 52a, 52c, 52d, 12c-l, 12a and into container 90. With only segment 12b still containing saline solution, system 10 directs pump 120 to draw clean air through segments 52a, 52c, 52e, 42e, 12k-l, cavity 18, and segments 12a-i, into segment 112 so that the remaining saline is collected in container 110 and the excess air is vented out vent conduit 114.

Each of the product-carrying conduits of system 10 are now clean and ready to begin circulating a second fluid 22 from one of sources 44a-c. Container 90 contains a small amount of hazardous product fluid 22 therein and may be handled appropriately with minimum exposure for the operator. Container 110 contains a used wash saline wash fluid. The operator may desire to replace new container 20 with a third and clean container 20 prior to introducing a new fluid of interest into system 10.

The present invention thus provides a system and method for non-destructive sampling of a fluid within a fluid handling system saving both valuable fluid and the need to positively control and dispose of radioactive or biologically sensitive fluids. The present invention reduces the loss of fluid product resulting in higher efficiency and higher accuracy in predicting the characteristics of the fluid. The present invention provides a remotely automated system which reduces or eliminates operator exposure to the fluid as well as reducing or eliminating exposure of the fluid to the open environment. When handling a radioactive fluid such as Thalium-201 (which typically includes some level of Thalium 202), both an operator's whole body dose and extremity exposure is greatly reduced over the manual methods of the prior art. As the operator need not manually adjust the fluid characteristics, such as the pH level, the present invention greatly reduces variability resulting from operator error or from different operators performing the same task differently, this variability has been measured to three decimal places. The present invention also provides a system which is able to remotely and automatically clean the fluid handling surfaces in a matter of several minutes, replacing the longer more arduous cleaning required of the prior art.

While the particular embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A fluid sampling system for sampling the contents of a container of fluid, comprising:
   an elongate hollow sampling conduit extending between a first end for withdrawing the fluid from the container and a second end for returning the fluid to the container;
   a pump for circulating the fluid between the container and said sampling conduit;
   a sample probe having a tip extending into said sampling conduit so as to contact the fluid within the sampling conduit;
   a calibration fluid source comprising a first buffer supply source providing a first buffer of known properties in selectable fluid communication with said sampling conduit and a second buffer supply source providing a second buffer of known properties in selectable fluid communication with said sampling conduit;
   a wash fluid source comprising a first cleaning fluid supply source providing a first cleaning fluid in selectable fluid communication with said sampling conduit; and
   an additive source comprising a first additive supply source providing a first additive in selectable fluid communication with said sampling conduit and a second additive supply source providing a second additive in selectable fluid communication with said sampling conduit;
   and
   a controller unit for controlling flow of the fluid to and from the container as well as the flow of fluid from said at least one of said calibration fluid source, wash fluid source, and said additive \source into the sampling conduit and monitoring the properties of interest of the fluid within the sampling conduit via signals received from said sample probe.

2. The fluid sampling system of claim 1, wherein said wash fluid source further comprises a second cleaning fluid source providing a second cleaning fluid in selectable fluid communication with said sampling conduit.

3. The fluid sampling system of claim 1, wherein said wash fluid source further comprises a first drying fluid supply source providing a first drying fluid in selectable fluid communication with said sampling conduit.

4. The fluid sampling system of claim 1, further comprising a waste conduit in selectable fluid communication with said sampling conduit.

5. The fluid sampling system of claim 1, wherein said pump means further comprises a first and second pump head, said first pump head circulating flow through said sampling conduit, said second pump head being in fluid communication between a second clean fluid source and the container.

6. The fluid sampling system of claim 1, wherein said pump comprises a peristaltic pump.

7. The fluid sampling system of claim 1, wherein said first and second ends of said sampling conduit are in sealed fluid communication with the interior of the container.

8. A fluid sampling system for sampling the contents of a source of fluid, comprising:
   an elongate hollow sampling conduit extending between a first end for withdrawing the fluid from the container and a second end for returning the fluid to the container;
   pump means for circulating the fluid between the container and said sampling conduit;

a sample probe having a tip extending into said sampling conduit so as to contact the fluid within the sampling conduit;

a first buffer source providing a first buffer of known properties in selectable fluid communication with said sampling conduit;

a first clean fluid source providing a first cleaning fluid in selectable fluid communication with said sampling conduit;

a first drying fluid source providing a first drying fluid in selectable fluid communication with said sampling conduit;

a first additive source providing a first additive in selectable fluid communication with said sampling conduit; and a controller unit for controlling flow of the fluid, said first buffer, said first additive, said first cleaning fluid, and said drying fluid within the sampling conduit and monitoring the properties of interest of the fluid within the sampling conduit via signals received from said sample probe.

9. The fluid sampling system of claim 8, further comprising:

a second buffer source providing a second buffer of known properties in selectable fluid communication with said sampling conduit; and a second additive source providing a second additive in selectable fluid communication with said sampling conduit.

10. The fluid sampling system of claim 8, further comprising a calibration conduit in selectable fluid communication with said first buffer source and said second buffer source and in selectable fluid communication with said sampling conduit.

11. The fluid sampling system of claim 9, further comprising a cleaning conduit in selectable fluid communication with said first cleaning fluid source and said first drying fluid source and in selectable fluid communication with said sampling conduit.

12. The fluid sampling system of claim 11, further comprising a stand-off conduit in selectable fluid communication with each of said sampling conduit, said calibration conduit and said cleaning conduit.

13. The fluid sampling system of claim 7, wherein said pump means further comprises a secondary pump means for transferring a fluid from an external holding source to the container.

14. The fluid sampling system of claim 13, wherein said secondary pump means extends in selectable fluid communication between the container and one of said external supply source and a secondary cleaning fluid source for providing a cleaning fluid to the container.

15. The fluid sampling system of claim 7, further comprising a probe waste conduit in selectable fluid communication with said sampling conduit for conducting waste fluids from said sampling conduit.

16. The fluid sampling system of claim 7, further comprising a drain conduit in selectable fluid communication with said sampling conduit.

17. The fluid sampling system of claim 7, wherein said controller unit further comprises means for determining one of the pH of the fluid, the purity of the fluid, and the concentration of the fluid.

18. The fluid sampling system of claim 7, further comprising a first additive pump for transferring said first additive into said sampling conduit.

19. The fluid sampling system of claim 18, wherein said first additive pump comprises a syringe pump in fluid communication with said first additive source.

20. The fluid sampling system of claim 18, further comprising a second additive pump for transferring said second additive into said sampling conduit.

21. The fluid sampling system of claim 20, wherein said second additive pump further comprises a syringe pump in fluid communication with said second additive source.

22. The fluid sampling system of claim 16, further comprising a waste pump connected in fluid communication with said waste conduit for transferring waste fluid from said sampling conduit.

23. The fluid sampling system of claim 22, wherein said waste pump further comprises a syringe pump.

24. The fluid sampling system of claim 7, wherein said first buffer is characterized by a known pH level.

25. The fluid sampling system of claim 9, wherein said second buffer is characterized by a known pH level.

26. The fluid sampling system of claim 8, wherein said first cleaning fluid is water.

27. The fluid sampling system of claim 7, wherein said first drying fluid is air.

28. The fluid sampling system of claim 7, wherein the fluid to be sampled comprises liquid thalium.

29. A fluid sampling system for sampling the contents of a source of fluid, comprising:

an elongate hollow sampling conduit extending between a first end for withdrawing the fluid from the container and a second end for returning the fluid to the container;

pump means for circulating the fluid between the container and said sampling conduit;

a sample probe having a tip extending into said sampling conduit so as to contact the fluid within the sampling conduit;

a first clean fluid source providing a first cleaning fluid in selectable fluid communication with said sampling conduit; and a controller unit for controlling flow of the fluid, said first buffer, said first additive, said first cleaning fluid, and said drying fluid within the sampling conduit and monitoring the properties of interest of the fluid within the sampling conduit via signals received from said sample probe.

30. The fluid sampling system of claim 29, further comprising a first buffer source providing a first buffer of known properties in selectable fluid communication with said sampling conduit.

31. The fluid sampling system of claim 30, further comprising a first drying fluid source providing a first drying fluid in selectable fluid communication with said sampling conduit.

32. The fluid sampling system of claim 31, further comprising a first additive source providing a first additive in selectable fluid communication with said sampling conduit.

33. The fluid sampling system of claim 32, further comprising a second buffer source providing a second buffer of known properties in selectable fluid communication with said sampling conduit.

34. The fluid sampling system of claim 30, further comprising a first additive source providing a first additive in selectable fluid communication with said sampling conduit.

35. The fluid sampling system of claim 30, further comprising a cleaning conduit in selectable fluid communication with said first cleaning fluid source and said first drying fluid source and in selectable fluid communication with said sampling conduit.

36. The fluid sampling system of claim 30, further comprising a waste conduit in selectable fluid communication with said sampling conduit for conducting waste fluids from said sampling conduit.

37. The fluid sampling system of claim 36, further comprising a drain conduit in selectable fluid communication with said sampling conduit.

38. The fluid sampling system of claim 30, wherein said controller unit further comprises means for determining one of the pH of the fluid, the purity of the fluid, the concentration of the fluid.

39. The fluid sampling system of claim 30, further comprising a first additive pump for transferring said first additive into said sampling conduit.

40. The fluid sampling system of claim 39, wherein said first additive pump comprises a syringe pump in fluid communication with said first additive source.

41. The fluid sampling system of claim 40, further comprising a second additive pump for transferring said second additive into said sampling conduit.

42. The fluid sampling system of claim 41, wherein said second additive pump further comprises a syringe pump in fluid communication with said second additive source.

43. The fluid sampling system of claim 42, wherein said first buffer is characterized by a known pH level.

44. The fluid sampling system of claim 30, wherein said second buffer is characterized by a known pH level.

* * * * *